United States Patent
Kim et al.

(10) Patent No.: US 8,208,029 B2
(45) Date of Patent: Jun. 26, 2012

(54) METHOD AND SYSTEM FOR CALIBRATING CAMERA WITH RECTIFICATION HOMOGRAPHY OF IMAGED PARALLELOGRAM

(75) Inventors: Jae Hean Kim, Daejeon (KR); Jin Ho Kim, Daejeon (KR); Byoung Tae Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1149 days.

(21) Appl. No.: 12/042,156

(22) Filed: Mar. 4, 2008

(65) Prior Publication Data

US 2009/0153669 A1 Jun. 18, 2009

(30) Foreign Application Priority Data

Dec. 17, 2007 (KR) .................. 10-2007-0132671

(51) Int. Cl.
*H04N 17/00* (2006.01)
*H04N 17/02* (2006.01)

(52) U.S. Cl. ......... 348/187; 348/175; 348/176; 348/188

(58) Field of Classification Search .................. 348/175, 348/176, 187, 188
See application file for complete search history.

(56) References Cited

U.S. PATENT DOCUMENTS

| | | | |
|---|---|---|---|
| 6,437,823 B1 | 8/2002 | Zhang | |
| 7,155,030 B2 | 12/2006 | Kim et al. | |
| 7,274,388 B2 | 9/2007 | Zhang | |

FOREIGN PATENT DOCUMENTS

| | | |
|---|---|---|
| KR | 10-1997-0004392 | 3/1997 |
| KR | 10-2002-0077685 | 10/2002 |
| KR | 10-2007-0101580 | 10/2007 |

OTHER PUBLICATIONS

Yong-In Yoon et al.; "3D Reconstruction Using the Planar Homography"; Conference on Korea Information and Communications Society; vol. 31; No. 4C; 2006; pp. 381-390.
Young Sup Park et al.; "Reconstruction of a 3D Model using the Midpoints of Line Segments in a Single Image"; Conference on the Korean Institute of Information Scientists and Engineers; vol. 32; No. 4; Apr. 2005; pp. 168-176.
Chi Hwan Kim et al., "3D Motion of Objects in a Spherical Image-based Virtual Environment Using Vanishing Points"; Conference on the Korean Institute of Information Scientists and Engineers; Oct. 2001; 4 pages.
Korean Notice of Allowance for application No. 10-2007-013267.
Visual Modeling with a Hand-Held Camera, International Journal of Computer Vision 59(3), 207-232, 2004.

(Continued)

*Primary Examiner* — Hunter B Lonsberry
(74) *Attorney, Agent, or Firm* — Lowe Hauptman Ham & Berner, LLP

(57) ABSTRACT

A method for calibrating a camera including (a) obtaining a two-dimensional (2D) homography that maps each of parallelograms projected onto two images taken by the camera into a rectangle, wherein the 2D homography is defined as a rectification homography and wherein new cameras that have virtual images are defined as rectified cameras and a new infinite homography is generated between the two rectified cameras, the virtual images being transformed from original images by the rectification homography; (b) obtaining an original infinite homography by using the correlations among the new infinite homography, the rectification homography and the original infinite homography; and (c) obtaining intrinsic camera parameters based on the correlation between the original infinite homography and the intrinsic camera parameters, thereby calibrating the camera.

7 Claims, 4 Drawing Sheets

OTHER PUBLICATIONS

Using Geometric Constraints through Parallelepipeds for Calibration and 3D Modeling, IEEE Transactions on Pattern Analysis and Machine Intelligence, vol. 27, No. 2, Feb. 2005.

Stratified Self-Calibration with the Modulus Constraint, IEEE Transactions on Pattern Analysis and Machine Intelligence, vol. 21, No. 8, Aug. 1999.

A Versatile Camera Calibration Technique for High-Accuracy 3D Machine Vision Metrology Using Off-the-Shelf TV Cameras and Lenses, IEEE Journal of Robotics and Automation, vol. RA-3, No. 4, Aug. 1987.

A Flexible New Technique for Camera Calibration, IEEE Transactions on Pattern Analysis and Machine Intelligence, vol. 22, No. 11, Nov. 2000.

Estimating Intrinsic Parameters of Cameras using Two Arbitrary Rectangles, Jun-Sik Kim and In So Kweon, 2006 IEEE.

Combining Scene and Auto-calibration Constraints, David Liebowitz and Andrew Zisserman.

METHOD AND SYSTEM FOR CALIBRATING CAMERA WITH RECTIFICATION HOMOGRAPHY OF IMAGED PARALLELOGRAM

FIELD OF THE INVENTION

The present invention relates to the calibration of a camera using a rectification homography of an imaged parallelogram, and more particularly, to a method and system for calibrating a camera by correcting the intrinsic camera parameters from parallelograms, which do exist on planes of 3-dimensional (3D) space, projected onto two images taken by the camera.

This work was supported by the IT R&D program of MIC/IITA [2007-S-051-01, Software Development for Digital Creature].

BACKGROUND OF THE INVENTION

A calibrating operation of a camera is to obtain intrinsic camera parameters that should be done in advance for every operation of acquiring three-dimensional (3D) information by using the camera, and can be widely used for computer vision, robotics, film industry, human-computer interaction, etc.

Calibration methods of a camera may be roughly divided into three as follows:

The first method is to use a calibration pattern specially made for the camera calibration. This enables to precisely detect a relative position of a specific marker on the calibration pattern in advance, thereby getting an accurate result. However, this method has a disadvantage in that a heavy and large calibration pattern has to be carried all the time.

The second method is to take a lot of continuous images and utilize them for the calibration of a camera. This is a method based on projective geometry reconstruction, which is called auto-calibration, and uses the assumption that some of the intrinsic parameters of the camera are known. Although this method can be carried out without any geometric information about a specific calibration pattern or a scene within an image, it has a disadvantage in that a lot of images are required for accuracy.

The third method is to calibrate a camera by using geometric information existing in the scene within an image taken by the camera. The geometric information existing in the scene refers to a set of two parallel lines perpendicular to each other, a sphere, a circle, etc. With this information, no specific calibration pattern is required, and the camera can be precisely calibrated without using a lot of images.

Among the conventional methods for calibrating a camera, the method for calibrating a camera by using geometric information existing in the scene within an image taken by the camera has the above-described advantages, but has the problem of being unable to calibrate the camera if there exists no geometric information, such as a set of two parallel lines perpendicular to each other, a sphere, a circle, etc., in the scene within the image taken by the camera.

SUMMARY OF THE INVENTION

It is, therefore, an object of the present invention to provide a method and system for calibrating a camera by correcting intrinsic camera parameters using a plurality of parallelograms, the size and shape of which are unknown, that do exist on two or more planes of 3D space, projected onto two images taken by the camera.

In accordance with an aspect of the present invention, there is provided a method for calibrating a camera comprising:

(a) obtaining a two-dimensional (2D) homography that maps each of parallelograms projected onto two images taken by the camera into a rectangle, wherein the 2D homography is defined as a rectification homography and wherein new cameras that have virtual images are defined as rectified cameras and a new infinite homography is generated between the two rectified cameras, the virtual images being transformed from original images using the rectification homography;

(b) obtaining an original infinite homography by using the correlations among the new infinite homography, the rectification homography and the original infinite homography; and (c) obtaining intrinsic camera parameters based on the correlation between the original infinite homography and the intrinsic camera parameters, thereby calibrating the camera.

In accordance with an aspect of the present invention, there is provided a system for calibrating a camera comprising:

a rectification homography generator for obtaining a two-dimensional (2D) homography that maps each of parallelograms projected onto two images taken by the camera into a rectangle, wherein the 2D homography is defined as a rectification homography and wherein new cameras that have virtual images are defined as rectified cameras and a new infinite homography is generated between two rectified cameras, the virtual images being transformed from original images using the rectification homography;

an infinite homography calculator for obtaining an original infinite homography by using the correlations among the new infinite homography, the rectification homography and the original infinite homography; and a camera calibrator for obtaining intrinsic camera parameters based on the correlation between the original infinite homography and the intrinsic camera parameters of the camera to calibrate the camera.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE EMBODIMENTS

Hereinafter, embodiments of the present invention will be described in detail with reference to the accompanying drawings.

In the present invention, parallelograms are employed as geometric information existing in scenes within two images taken by one camera. Further, in the present invention, it is assumed that there is a few number of images required to calibrate a camera and are only parallelograms as the geometric information existing in the scenes. In addition, in the present invention, it is assumed that all the edges of the respective parallelograms are on the same planes of a 3-dimensional (3D) space. Therefore, it is possible to reduce the number of parameters to be considered, thereby improving the accuracy as compared to the method using the correspondence of vanishing points. Further, even if the number of vanishing points not co-linear is not more than three but only three, camera calibration can be performed without the process of projective geometry reconstruction requiring a lot of corresponding points between images.

Figure 1:
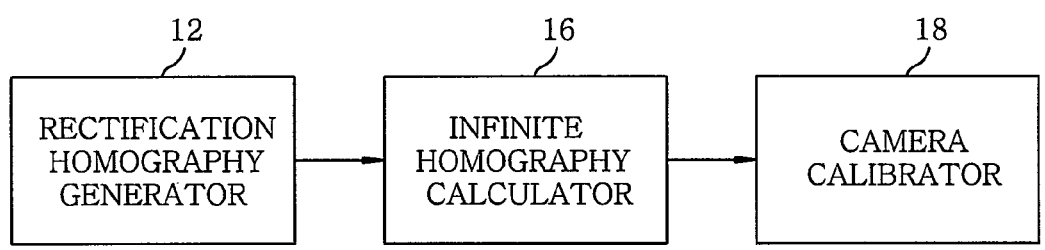
FIG. 1 shows a block diagram of a system for calibrating a camera using the rectification homography of an imaged parallelogram in accordance with the present invention.

Referring now to FIG. 1, there is shown a block diagram of a system for calibrating a camera using a rectification homography of imaged parallelograms in accordance with the present invention.

As shown in FIG. 1, the system for calibrating a camera includes a rectification homography generator 12, an infinite homography calculator 16, and a camera calibrator 18.

The rectification homography generator 12 generates a two-dimensional (2D) homography, which is a 3×3 matrix, that maps each of parallelograms projected onto two images taken by the camera (not shown) into a rectangle. The 2D homography is defined as a rectification homography. The rectangle for obtaining such a rectification homography may be of any size or shape only if the horizontal and vertical axes of the images are parallel with edges of the rectangle, respectively.

Figure 2:
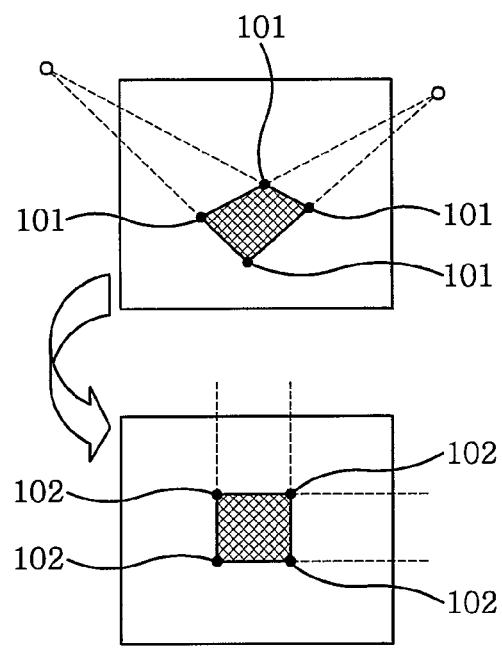
FIG. 2 is an illustrative view of a rectified camera image transformed by a rectification homography defined in the present invention.

FIG. 2 is an illustrative view of mapping a parallelogram projected on an image into a rectangle by the rectification homography defined in the rectification homography generator 12. In FIG. 2, reference numeral 101 denotes each of the vertexes of the parallelogram projected onto the image, and reference numeral 102 represents a vertex of the rectangle that is arbitrarily selected in order to obtain the rectification homography.

By virtue of the rectification homography, two new cameras that will have virtual images are defined as rectified cameras, the virtual images being transformed from original images.

Figure 3:
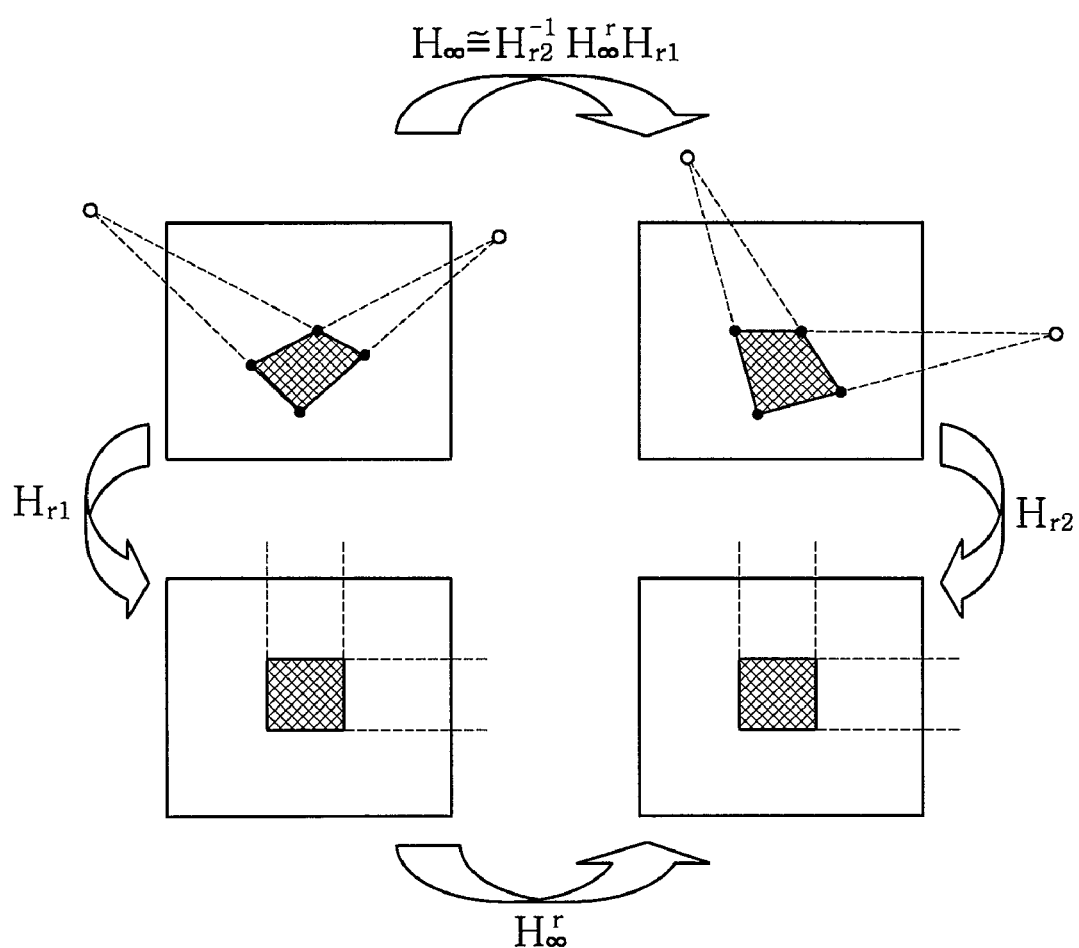
FIG. 3 is a view showing the correlations among a new infinite homography, a rectification homography and an original infinite homography between rectified cameras.

Referring to FIG. 3, there is illustrated that an infinite homography is generated for each parallelogram projected onto the virtual images taken by the two rectified cameras. The infinite homography between the two rectified cameras is defined as a new infinite homography.

Figure 4:
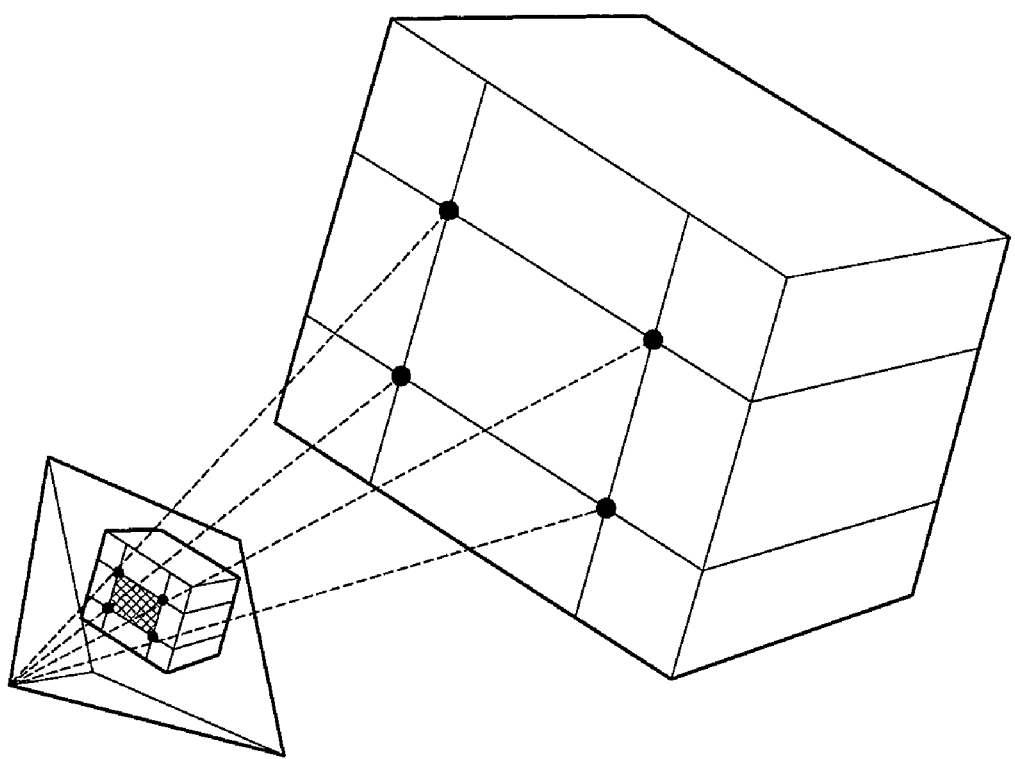
FIG. 4 is an illustrative view of a 3D image of a parallelogram projected onto a camera image assumed in the present invention.

The new infinite homography ($H_\infty^{rk}$) can be represented by only 4 arbitrary parameters ($\lambda_k, u_k, v_k, w_k$) as in the following Equation 1, under the assumption that all the edges of each parallelogram are on the same planes of 3D space, as shown in FIG. 4.

$$H_\infty^{rk} = \begin{bmatrix} \lambda_k & 0 & u_k \\ 0 & \lambda_k & v_k \\ 0 & 0 & w_k \end{bmatrix} \quad \text{Equation (1)}$$

Equation (1) is subjected to a k-th parallelogram existing in the scene in the virtual images, and the new infinite homography is obtained for each parallelogram.

Figure 5A:
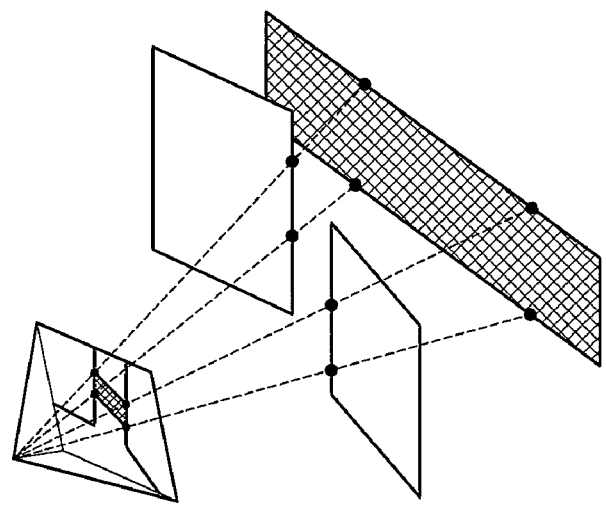
FIGS. 5A and 5B are illustrative views of 3D image of a parallelogram projected onto a camera image to which the present invention is not applicable.
Figure 5B:
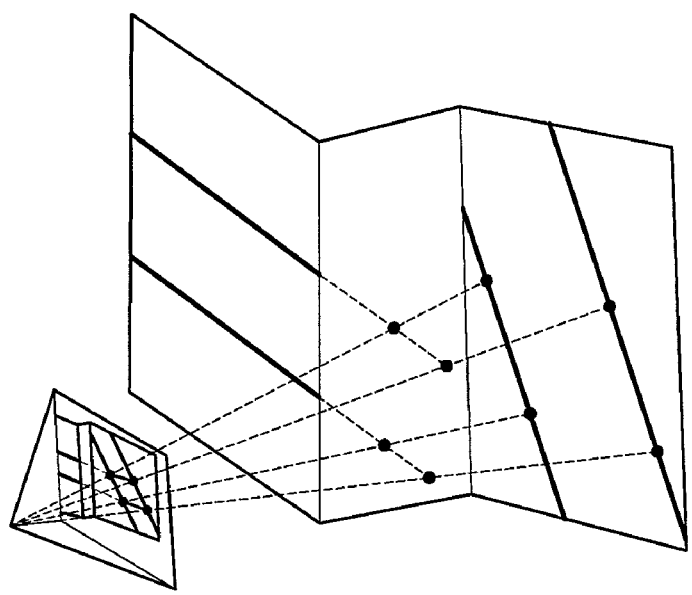

However, as in FIGS. 5A and 5B, in case where parallelograms are projected on camera images but all the edges of the respective parallelograms are not actually on the same planes of 3D space, the method of the present invention cannot be applied.

Further, as shown in FIG. 3, for each parallelogram, the correlations among the new infinite homography, the rectification homography and the original infinite homography can be obtained.

The infinite homography calculator 16 calculates the original infinite homography by using the correlations. For example, when there is an m-number of parallelograms, the original infinite homography is represented as:

$$H_\infty = H_{r2}^{k-1} \cdot H_\infty^{rk} \cdot H_{r1}^k \quad k=1,\ldots,m \quad \text{Equation (2)}$$

wherein $H_\infty$ denotes the original infinite homography, and $H_{r1}^k$ and $H_{r2}^k$ denote the rectification homographies corresponding to the k-th parallelogram, for each of two images.

The above Equation (2) is obtained in case of two images. However, in case where there are a plurality of images more than two, the Equation (2) will be obtained as many as the number of the images in pairs and thus the number of $H_\infty$ will also be of the same number as that of the Equations (2).

The intrinsic camera parameters used in the field of computer vision is represented as in the following equation:

$$K = \begin{bmatrix} f_u & s & u_0 \\ 0 & f_v & v_0 \\ 0 & 0 & 1 \end{bmatrix} \quad \text{Equation (3)}$$

wherein $f_u$ and $f_v$ denote the focal lengths of a camera, which are represented in the horizontal and vertical pixel lengths of an image sensor in the camera, respectively, S denotes the degree of slope of the vertical axis with respect to the horizontal axis of the image sensor, and $u_0$ and $v_0$ denotes the cross points of the image sensor and the optical axis in a pixel coordinate.

Finally, the camera calibrator 18 obtains the intrinsic camera parameters using the correlation between the original infinite homography and the intrinsic camera parameters under the assumption that the intrinsic camera parameters are not changed upon capturing each image, to thereby calibrate the camera. The correlation may be calculated by the following:

$$\omega = H_\infty^{ij-T} \omega H_\infty^{ij-1} \quad \text{Equation (4)}$$

wherein $H_\infty^{ij}$ denotes the original infinite homography that is normalized such that the determinant becomes 1, and which is obtained between an i-th camera and a j-th camera. This Equation (4) is created as many as the number of the images in pairs if there are a plurality of images more than two, and can be solved by a linear homogeneous equation for the parameters of $\omega$, wherein $\omega$ is represented as $K^{-T}K^{-1}$. After $\omega$ is obtained by the above Equation (4), K can be derived through Cholesky factorization.

As described above, in accordance with the present invention, when there are a small number of images taken by cameras and are only parallelograms as geometric information existing in the scene of images, camera calibration with a higher accuracy can be performed as compared to the method using the correspondence of vanishing points. Even if the number of vanishing points not co-linear is not more than three but only three, the infinite homography can be acquired without the process of projective geometry reconstruction requiring a lot of corresponding points between images, thereby enabling camera calibration.

Accordingly, even when a user does not carry a special calibration pattern and cannot capture a large number of images, it is possible to employ only a small number of imaged parallelograms in calibrating a camera to obtain 3D information using the calibrated camera.

On the other hand, the system for calibrating a camera using the rectification homography of an imaged parallelogram of the present invention may be implemented by a software program that is stored in a computer-readable storage medium such as CD-ROM, RAM, ROM, floppy disk, hard disk, optical magnetic disk, and so on.

While the present invention has been described with respect to certain preferred embodiments, it will be apparent to those skilled in the art that various changes and modifications may be made without departing from the scope of the invention as defined in the following claims.

What is claimed is:

1. A method for calibrating a camera comprising:
    (a) obtaining a two-dimensional (2D) homography that maps each of parallelograms projected onto two images taken by the camera into a rectangle, wherein the 2D homography is defined as a rectification homography and wherein new cameras that have virtual images are defined as rectified cameras and a new infinite homography is generated between the two rectified cameras under the assumption that all the edges of each parallelogram are on the same planes of 3D space, the virtual images being transformed from original images using the rectification homography;
    (b) obtaining an original infinite homography by using the correlation among the new infinite homography, the rectification homography and the original infinite homography; and
    (c) obtaining intrinsic camera parameters based on the correlation between the original infinite homography and the intrinsic camera parameters, thereby calibrating the camera.

2. The method of claim 1, wherein the rectangle has two edges parallel to the horizontal and vertical axes of the images.

3. The method of claim 1, wherein the new infinite homography ($H_\infty^{r_k}$) is represented by only 4 arbitrary parameters ($\lambda_k$, $u_k$, $v_k$, $w_k$) as in the following equation:

$$H_\infty^{r_k} = \begin{bmatrix} \lambda_k & 0 & u_k \\ 0 & \lambda_k & v_k \\ 0 & 0 & w_k \end{bmatrix}$$

wherein the above Equation is subjected to a k-th parallelogram existing in the scenes in the virtual images, and the new infinite homography is obtained for each parallelogram.

4. The method of claim 1, wherein the intrinsic camera parameters are obtained under the assumption that the intrinsic camera parameters are not changed upon capturing each image.

5. A system for calibrating a camera comprising:
    a rectification homography generator for obtaining a two-dimensional (2D) homography that maps each of parallelograms projected onto two images taken by the camera into a rectangle, wherein the 2D homography is defined as a rectification homography and wherein new cameras that have virtual images are defined as rectified cameras and a new infinite homography is generated between two rectified cameras under the assumption that all the edges of each parallelogram are on the same planes of 3D space, the virtual images being transformed from an original images using the rectification homography;
    an infinite homography calculator for obtaining an original infinite homography by using the correlations among the new infinite homography, the rectification homography and the original infinite homography; and
    a camera calibrator for obtaining intrinsic camera parameters based on the correlation between the original infinite homography and the intrinsic camera parameters of the camera to calibrate the camera.

6. The system of claim 5, wherein the rectangle has two edges parallel to the horizontal and vertical axes of the images.

7. The system of claim 5, wherein the camera calibrator obtains the intrinsic camera parameters under the assumption that the intrinsic camera parameters are not changed upon capturing each image.

* * * * *